US010397600B1

(12) United States Patent
Xu et al.

(10) Patent No.: US 10,397,600 B1
(45) Date of Patent: Aug. 27, 2019

(54) DYNAMIC REFERENCE MOTION VECTOR CODING MODE

(71) Applicant: GOOGLE LLC, Mountain View, CA (US)

(72) Inventors: Yaowu Xu, Saratoga, CA (US); Jingning Han, Santa Clara, CA (US)

(73) Assignee: GOOGLE LLC, Mountain View, CA (US)

(*) Notice: Subject to any disclaimer, the term of this patent is extended or adjusted under 35 U.S.C. 154(b) by 363 days.

(21) Appl. No.: 15/131,079

(22) Filed: Apr. 18, 2016

Related U.S. Application Data

(60) Provisional application No. 62/288,553, filed on Jan. 29, 2016.

(51) Int. Cl.
G06T 7/20 (2017.01)
G06T 9/00 (2006.01)
H04N 19/44 (2014.01)
H04N 19/52 (2014.01)
H04N 19/109 (2014.01)
H04N 19/139 (2014.01)
(Continued)

(52) U.S. Cl.
CPC ............... *H04N 19/52* (2014.11); *G06T 7/20* (2013.01); *G06T 9/00* (2013.01); *H04N 19/109* (2014.11);
(Continued)

(58) Field of Classification Search
None
See application file for complete search history.

(56) References Cited

U.S. PATENT DOCUMENTS 5,384,865 A 1/1995 Loveridge
5,801,778 A 9/1998 Ju
(Continued)

FOREIGN PATENT DOCUMENTS

EP 0477616 A2 4/1992
EP 0634873 A2 1/1995
(Continued)

OTHER PUBLICATIONS

Grange, A. et al., "A VP9 Bitstream Overview draft-grange-vp9-bitstream-00", Network Working Group (Feb. 18, 2013) (Year: 2013).*
(Continued)

*Primary Examiner* — Lindsay J Uhl
(74) *Attorney, Agent, or Firm* — Young Basile Hanlon & MacFarlane, P.C.

(57) ABSTRACT

Techniques are described to use a reference motion vector to reduce the amount of bits needed to encode motion vectors for inter prediction. One method includes identifying a candidate motion vector used to inter predict each of a plurality of previously coded blocks to define a plurality of candidate motion vectors, determining a distance between the previously decoded block associated with the candidate motion vector and a current block, determining a popularity value for each candidate motion vector based on a set of previously coded pixels associated with the candidate motion vector, and ranking the candidate motion vectors according to a priority value for each candidate motion vector. The priority value, based on the distance and the popularity value associated with the candidate motion vector, is used to select a reference motion vector from the candidate motion vectors that is used to encode the motion vector for the current block.

24 Claims, 9 Drawing Sheets

(51) Int. Cl.
  *H04N 19/159* (2014.01)
  *H04N 19/179* (2014.01)
  *H04N 19/527* (2014.01)
  *H04N 19/176* (2014.01)

(52) U.S. Cl.
  CPC ......... *H04N 19/139* (2014.11); *H04N 19/159* (2014.11); *H04N 19/176* (2014.11); *H04N 19/44* (2014.11); *H04N 19/527* (2014.11)

(56) References Cited

U.S. PATENT DOCUMENTS

| | | | |
|---|---|---|---|
| 6,072,904 | A | 6/2000 | Desai et al. |
| 6,072,905 | A | 6/2000 | Cucchi et al. |
| 6,466,624 | B1 | 10/2002 | Fogg |
| 6,487,313 | B1 | 11/2002 | De Haan et al. |
| 6,560,366 | B1 | 5/2003 | Wilkins |
| 6,741,655 | B1 | 5/2004 | Chang et al. |
| 7,027,654 | B1 | 4/2006 | Ameres et al. |
| 7,085,401 | B2 | 8/2006 | Averbuch et al. |
| 7,260,148 | B2 | 8/2007 | Sohm |
| 7,343,044 | B2 | 3/2008 | Baba et al. |
| 7,499,492 | B1* | 3/2009 | Ameres ............... H04N 19/147 375/240.12 |
| 7,697,769 | B2 | 4/2010 | Baba et al. |
| 7,809,212 | B2 | 10/2010 | Tulkki |
| 8,045,620 | B2 | 10/2011 | Oshikiri et al. |
| 8,064,644 | B2 | 11/2011 | Kokaram |
| 8,229,174 | B2 | 7/2012 | Kokaram |
| 8,385,418 | B2 | 2/2013 | Crawford et al. |
| 8,611,415 | B1 | 12/2013 | Xu et al. |
| 8,761,261 | B1 | 6/2014 | Wang |
| 2001/0014124 | A1 | 8/2001 | Nishikawa |
| 2002/0003575 | A1 | 1/2002 | Marchese |
| 2002/0044693 | A1 | 4/2002 | Ogawa |
| 2003/0012281 | A1 | 1/2003 | Cho et al. |
| 2003/0053544 | A1 | 3/2003 | Yasunari et al. |
| 2005/0013367 | A1 | 1/2005 | Gallant et al. |
| 2005/0286635 | A1 | 12/2005 | Kumar et al. |
| 2006/0018381 | A1 | 1/2006 | Luo et al. |
| 2006/0062481 | A1 | 3/2006 | Suvanto |
| 2006/0176316 | A1 | 8/2006 | Nagasaki et al. |
| 2006/0245499 | A1 | 11/2006 | Chiu et al. |
| 2008/0002772 | A1 | 1/2008 | Song et al. |
| 2009/0080523 | A1 | 3/2009 | McDowell |
| 2009/0122866 | A1 | 5/2009 | Crawford et al. |
| 2011/0194608 | A1* | 8/2011 | Rusert ............... H04N 19/105 375/240.16 |
| 2012/0044998 | A1 | 2/2012 | Kokaram |
| 2012/0213280 | A1 | 8/2012 | Srinivasan et al. |
| 2013/0271666 | A1 | 10/2013 | Crawford et al. |
| 2016/0050411 | A1 | 2/2016 | Wang |

FOREIGN PATENT DOCUMENTS

| | | | |
|---|---|---|---|
| EP | 0986252 | A1 | 3/2000 |
| EP | 1854067 | A2 | 11/2007 |
| EP | 1864502 | A2 | 12/2007 |
| GB | 2307133 | A | 5/1997 |
| GB | 2365244 | A | 2/2002 |
| WO | 9922520 | A2 | 5/1999 |
| WO | 2004056089 | A2 | 7/2004 |
| WO | 2004082294 | A1 | 9/2004 |
| WO | 2006072925 | A2 | 7/2006 |
| WO | 2016028453 | A1 | 2/2016 |

OTHER PUBLICATIONS

Grange, A. et al., "A VP9 Bitstream Overview draft-grange-vp9-bitstream-00", Network Working Group (Feb. 18, 2013) (Year: 2013).*

Stiller, Christoph; "Motion-Estimation for Coding of Moving Video at 8 kbit/s with Gibbs Modeled Vectortield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pages.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Wiegand, Thomas, et al.; Long-Term Memory Motion-Compensated Prediction, date unknown.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Besag. J., On the statistical analysis of dirty pictures. Journal of the Royal Statistical Society B, 48:259-302, 1986.

Biemond, J., L. Looijenga, and D.E. Boekee. A pel-recursive Wiener-based displacement estimation algorithm. Signal Processing, 1987.

Bierling, M., Displacement estimation by heirarchical block matching. In SPIE VCIP, pp. 942-951, 1988.

Black, M.J., and P. Anandan. A framework for the robust estimation of optical flow. In Fourth International Conf. on Computer Vision, pp. 231-236, May 1993.

Boroczky, L., J.N. Driessen, and J. Biemond. Adaptive algorithms for pel-recursive displacement estimation. In Proceedings SPIE VCIP, pp. 1210-1221, 1990.

Chen, M-J, et al., Fast variable block-size motion estimation by merging refined motion vector for H.264, IEICE Transactions on Communications, Communications Society, Tokyo, JP, vol. E89B, No. 10, Oct. 1, 2006 pp. 2922-2928.

Denman, H., N. Rea, and A. Kokaram. Content based analysis for video from snooker broadcasts. In International Conference on Image and Video Retrieval CIVR2002, Jul. 18-19, 2002.

Higgins. H. The interpretation of a moving retinal image. Proceedings of the Royal Society, London, B 208:385-397, 1980.

Higgins. H., The visual ambiguity of a moving plane. Proceedings of the Royal Society, London, B 223:165-175, 1984.

Horn and B. Schunck. Determining optical flow. Artificial Intelligence, 17:185-203, 1981.

International Search Search Report & Written Opinion, RE: Application #PCT/US2015/042594 (citing new art); dated Nov. 25, 2015.

J.-S. Kim and R.-H. Park. A fast feature-based block matching algorithm using integral projections. IEEE J. Selected Areas in Communications, 10(5):986-971, Jun. 1992.

Kim et al., "Mapping parameter estimation using integral projections and segmented moving objects in object-oriented analysis-synthesis coding"; Optical Engineering 35(1), p. 156-165 (Jan. 1996).

Kokaram, A, R. Dahoyt, F. Pitie, and H. Denman. Simultaneous luminance and position stabilization for film and video. In Visual Communications and Image Processing, San Jose, California USA, Jan. 2003.

Kokaram. "On Missing Data Treatment for Degraded Video and Film Archives: A Survey and a New Bayesian Approach", IEEE Transactions on Image Processing, vol. 13, No. 3, pp. 397-415, 2004.

Kokoram, A, and P. Delacourt. A new global estimation algorithm and its application to retrieval in sports events. In IEEE International Workshop on Multimedia Signal Processing, MMSP '01, pp. 3-5, Oct. 2001.

Murat A. Tekalp, Block-Based Methods, Digital Video Processing, Prentice Hall Processing Series, Aug. 12, 1995, pp. 98-116, Prentice Hall PTRMurat, A. Tekalp. Digital Video Processing. pp. 72-94, 177-197. Prentice Hall, 1995.

Konzali W. et al. A Quadree-Structured Variable Block Size for H264 Motion Estimation, 24 Picture Coding Symposium, Dec. 15, 2004, San Fransisco.

(56) References Cited

OTHER PUBLICATIONS

Puri A, et al., Interframe coding with variable block-size motion compensation, Global Telecommunications Conference, Tokyo, Nov. 15, 1987, IEEE, US, vol. 1, pp. 1.7.01-2.7.05.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Black, et al. "Robust Dynamic Motion Estimation Over Time", IEEE Computer Society Conference on Computer Vision and Pattern Recognition, pp. 296-302, 1991.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Crawford, et al., "Gradient based dominant motion estimation with integral projections for real time video stabilization", 2004 International Conference of Image Processing (ICIP) Oct. 24-27, 2004 vol. 5 pp. 3371-3374.
Dirk Robinson and Peyman Milanfar. Fast local and global projection-based methods for affine motion estimation. Journal of Mathematical Imaging and Vision, 18:35-54, 2003.
Ebrahimi, Touradj, et al.; "Joint motion estimation and segmentation for very low bitrate video coding", SPIE vol. 2501, 1995, 12 pp.
Elias, D.P. and N.G. Kingsbury. An efficient block segmentation algorithm for true motion estimation. In Sixth IEEE International Conference on Image Processing and Its Applications, vol. 1, pp. 209-213. IEEE Conference Publications 443, Jul. 14-17, 1997.
F. Dufaux and J. Konrad. Efficient, robust and fast global motion estimation for video coding. IEEE Transactions on Image Processing, 9:497-501, 2000.
Ghanbari, M., The cross-search algorithm for motion estimation. IEEE Transactions on Communication, 38:950-953, Jul. 1990.
Guillotel, Philippe, et al.; "Comparison of motion vector coding techniques", SPIE vol. 2308, 1994, 11 pp.
Implementors'Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kelly, et al. "Graphics Hardware for Gradient Based Motion Estimation", Proceedings of SPIE-IS&T Electronic Imaging, vol. 5309, No. 1, pp. 92-103, 2004.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Kokaram, et al. "A System for Reconstruction of Missing Data in Image Sequences Using Sampled 3D AR Models and MRF Motion Priors", Computer Vision-ECCV '96. 4th European Conference on Computer Proceedings, vol. 2, pp. 613-624, 1996.
Kokaram, et al. "Automated Rig Removal with Bayesian Motion Interpolation", IEEE Conference Publication; 1st European conference on Visual Media Production, pp. 155-164, 2004.
Kokaram. AC, Motion Picture Restoration: Digital Algorithms for Artefact Suppression in Degraded Motion Picture Film and Video. Springer Verlag, ISBN 3-540-76040-7, pp. 13-46. 1998.
Lee, J. H., and J. B. Ra. Block Motion estimation based on selective integral projections. In IEEE ICIP, vol. I, pp. 689-693, 2002.
Liu, Bede, et al.; "A simple method to segment motion field for video coding", SPIE vol. 1818, Visual Communications and Image Processing 1992, 10 pp.

Liu Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Martinez. D.M, Model-based motion estimation and its application to restoration and interpolation of motion pictures. PhD thesis, Massachusetts Institute of Technology, 1986.
Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Odobez, J-M and P. Bouthemy. Robust multiresolution estimation of parametric motion models. Journal of visual communication and image representation, 6:348-365, 1995.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
P. Bouthemy, M. Gelgon, and F. Ganansia. A unified approach to shot change detection and camera motion characterization. IEEE Transactions on Circuits and Systems for Video Technology, 9:1030-1044, 1999.
P. Milanfar. A model of the effect of image motion in the radon transform domain. IEEE Trans. on Image Processing, 8 (9):1276-1281, 1999.
P.H.S. Torr. Geometric motion segmentation and model selection. Philosophical Transactions of the Royal Society A, pp. 1321-1340, 1998.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Seferidis, V. and M. Ghanbari. Heirarchical motion estimation using texture analysis. In IEEE 4th Conference on Image Processing, pp. 61-64, 1992.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video

(56) References Cited

OTHER PUBLICATIONS coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.

\* cited by examiner

US 10,397,600 B1

DYNAMIC REFERENCE MOTION VECTOR CODING MODE

CROSS-REFERENCE TO RELATED APPLICATIONS

This application claims priority to U.S. Provisional Application No. 62/288,553, filed Jan. 29, 2016, which is incorporated herein in its entirety by reference.

TECHNICAL FIELD

This disclosure relates to video encoding and decoding.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to video coding using reference motion vectors. The teachings herein can reduce the number of bits required to encode motion vectors for inter prediction. One method for encoding a video stream having a plurality of blocks including a current block described herein includes identifying, for each previously coded block of a plurality of previously coded blocks of the video stream, a candidate motion vector used to inter predict the previously coded block to define a plurality of candidate motion vectors; determining, using a processor, for each candidate motion vector of the plurality of candidate motion vectors, a distance between the previously coded block associated with the candidate motion vector and a current block of a current frame; determining, using the processor, for each candidate motion vector of the plurality of candidate motion vectors, a popularity value based on a set of previously coded pixels associated with the candidate motion vector; ranking each candidate motion vector of the plurality of candidate motion vectors according to a priority value for each candidate motion vector, the priority value based on the distance and popularity value of the candidate motion vector; and selecting, based on the priority values, a reference motion vector from the plurality of candidate motion vectors; and encoding a motion vector for the current block using the reference motion vector.

Another method described herein is a method for decoding an encoded video bitstream, including determining, from bits included in the encoded video bitstream, a reference frame on a condition that a motion vector for a current block to be decoded was encoded using a reference motion vector and whether the motion vector for the current block to be decoded was encoded using single prediction or compound prediction, the current block comprising one of a plurality of blocks of a current frame of the encoded video bitstream; identifying, for each previously decoded block of a plurality of previously decoded blocks, a candidate motion vector used to inter predict the previously decoded block to define a plurality of candidate motion vectors; determining, using a processor, for each candidate motion vector of the plurality of candidate motion vectors, a distance between the previously coded block associated with the candidate motion vector and the current block; determining, using the processor, for each candidate motion vector of the plurality of candidate motion vectors, a popularity value based on a set of previously coded pixels associated with the candidate motion vector; ranking each candidate motion vector of the plurality of candidate motion vectors according to a priority value for each candidate motion vector, the priority value based on the distance and the popularity value associated with the candidate motion vector; determining a predicted motion vector from the plurality of candidate motion vectors, the predicted motion vector associated with the candidate motion vector having the highest popularity value; determining a first effective motion vector and a second effective motion vector, the first effective motion vector and the second effective motion vector associated with the candidate motion vectors having the shortest distance; selecting the reference motion vector from the predicted motion vector, the first effective motion vector, and the second effective motion vector; and decoding a motion vector for the current block using the reference motion vector.

An example of an apparatus for encoding a video stream described herein includes a memory and a processor. The processor is configured to execute instructions stored in the memory to identify, for each previously coded block of a plurality of previously coded blocks, a candidate motion vector used to inter predict the previously coded block to define a plurality of candidate motion vectors; determine, for each candidate motion vector of the plurality of candidate motion vectors, a distance between the previously coded block associated with the candidate motion vector and a current block of a current frame; determine, for each candidate motion vector of the plurality of candidate motion vectors, a popularity value based on a set of previously coded pixels associated with the candidate motion vector; rank each candidate motion vector of the plurality of candidate motion vectors according to a priority value for each candidate motion vector, the priority value based on the distance and popularity value associated with the candidate motion vector; select, based on the priority values, a reference motion vector from the plurality of candidate motion vectors; and encode a motion vector for the current block using the reference motion vector.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
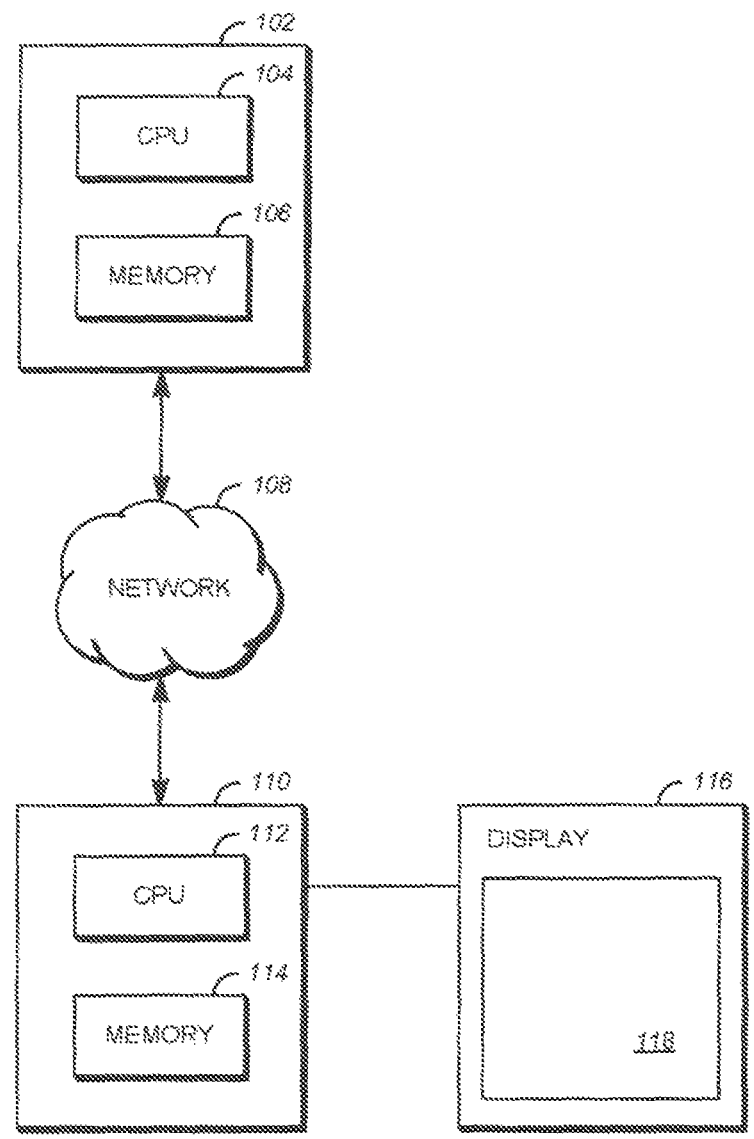
FIG. 1 is a schematic of a video encoding and decoding system in accordance with implementations of this disclosure.

Compression schemes related to coding video streams may include breaking each image into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. In this way, only the residual and parameters used to generate it need be added to the bitstream instead of including the entirety of the current block. This technique may be referred to as inter prediction.

One of the parameters in inter prediction is a motion vector that represents the spatial displacement of the previously coded block relative to the current block. The motion vector can be identified using a method of motion estimation, such as a motion search. In motion search, a portion of a reference frame can be translated to a succession of locations to form a prediction block that can be subtracted from a portion of a current frame to form a series of residuals. The X and Y translations corresponding to the location having the smallest residual can be selected as the motion vector. Bits representing the motion vector can be included in the encoded bitstream to permit a decoder to reproduce the prediction block and decode the portion of the encoded video bitstream associated with the motion vector.

For video compression schemes, the number of bits used to encode the motion vectors can be significant, especially for video streams encoded at lower data rates or higher compression ratios. To improve the encoding efficiency, a motion vector can be differentially encoded using a reference motion vector, i.e., only the difference between the motion vector and the reference motion vector is encoded. In some instances, the reference motion vector can be selected from previously used motion vectors in the video stream, for example, the last non-zero motion vector from neighboring blocks. Selecting a previously used motion vector to encode a current motion vector can further reduce the number of bits included in the encoded video bitstream and thereby reduce transmission and storage bandwidth requirements. Motion vector referencing modes allow a coding block to infer motion information from previously coded neighboring blocks.

In implementations of this disclosure, a reference motion vector can be selected from candidate motion vectors based on the distance between the reference block and the current block and the popularity of the reference motion vector. For example, the distance between the reference block and the current block can be based on the spatial displacement between the pixels in the previously coded block and the collocated pixels in the current block, measured in the unit of pixels. For example, the popularity of the motion vector can be based on the amount of previously coded pixels that use the motion vector. The more previously coded pixels that use the motion vector, the higher the probability of the motion vector. In one example, the popularity value is the number of previously coded pixels that use the motion vector. In another example, the popularity value is a percentage of previously coded pixels within an area that use the motion vector.

Due to the proximity of the current block to the pixels in the reference block, it is likely in many cases that the current block has similar motion characteristics to those pixels. Thus, a candidate motion vector used in a reference block near the current block may closely resemble the actual motion vector for the current block. Additionally, a candidate motion vector that is used by the most amount of pixels in a reference block near the current block would further resemble the actual motion vector for the current block. For this reason, the motion vector of the candidate motion vectors with the highest popularity used in a nearby reference block may be selected as the reference motion vector for the actual motion vector of the current block. Fewer bits can be used to code the actual motion vector by coding the small difference in motion vectors, thus improving the overall coding efficiency. Other ways in which the selected motion vector may be used are discussed hereinafter.

The candidate motion vectors may be limited to spatial-temporal neighboring motion vectors. That is, the pool of candidate motion vectors may be selected from regions neighboring regions of the current block. In some video coding schemes, particularly those where video frames are encoded out of order, it is desirable to include in the pool of candidate motion vectors motion information from video frames in the distant past or future. Encoding video frames can out of order may occur, for example, in the coding of so-called "alternate reference frames" that are not temporally neighboring to the frames coded immediately before or after them. An alternate reference frame may be a synthesized frame that does not occur in the input video stream or is a duplicate frame to one in the input video stream that is used for prediction and is generally not displayed following decoding. Such a frame can resemble a video frame in the non-adjacent future. Another example in which out of order encoding may occur is through the use of a so-called "golden reference frame," which is a reconstructed video frame that may or may not be neighboring to a current video frame and is stored in memory for use as a reference frame until replaced, e.g., by a new golden reference frame.

Herein, alternate reference frames and golden reference frames (also called alternate frames and golden frames), in addition to adjacent video frames are used to infer motion vectors for a block of a frame of video data using pixels from the non-adjacent or adjacent video frames to predict reconstructed pixels spatially near the block to be predicted. Other details are described herein after first describing an environment in which the disclosure may be implemented.

FIG. 1 is a schematic of a video encoding and decoding system 100 in which aspects of the disclosure can be implemented. An exemplary transmitting station 102 can be, for example, a computer having an internal configuration of hardware including a processor such as a central processing unit (CPU) 104 and a memory 106. CPU 104 is a controller for controlling the operations of transmitting station 102. CPU 104 can be connected to the memory 106 by, for example, a memory bus. Memory 106 can be read only memory (ROM), random access memory (RAM) or any other suitable memory device. Memory 106 can store data and program instructions that are used by CPU 104. Other suitable implementations of transmitting station 102 are possible. For example, the processing of transmitting station 102 can be distributed among multiple devices.

A network 108 connects transmitting station 102 and a receiving station 110 for encoding and decoding of the video stream. Specifically, the video stream can be encoded in transmitting station 102 and the encoded video stream can be decoded in receiving station 110. Network 108 can be, for example, the Internet. Network 108 can also be a local area network (LAN), wide area network (WAN), virtual private network (VPN), a cellular telephone network or any other means of transferring the video stream from transmitting station 102 to, in this example, receiving station 110.

Receiving station 110 can, in one example, be a computer having an internal configuration of hardware including a processor such as a CPU 112 and a memory 114. CPU 112 is a controller for controlling the operations of receiving station 110. CPU 112 can be connected to memory 114 by, for example, a memory bus. Memory 114 can be ROM, RAM or any other suitable memory device. Memory 114 can store data and program instructions that are used by CPU 112. Other suitable implementations of receiving station 110 are possible. For example, the processing of receiving station 110 can be distributed among multiple devices.

A display 116 configured to display a video stream can be connected to receiving station 110. Display 116 can be implemented in various ways, including by a liquid crystal display (LCD), a cathode-ray tube (CRT), or a light emitting diode display (LED), such as an OLED display. Display 116 is coupled to CPU 112 and can be configured to display a rendering 118 of the video stream decoded in receiving station 110.

Other implementations of the encoding and decoding system 100 are also possible. For example, one implementation can omit network 108 and/or display 116. In another implementation, a video stream can be encoded and then stored for transmission at a later time by receiving station 110 or any other device having memory. In one implementation, receiving station 110 receives (e.g., via network 108, a computer bus, or some communication pathway) the encoded video stream and stores the video stream for later decoding. In another implementation, additional components can be added to the encoding and decoding system 100. For example, a display or a video camera can be attached to transmitting station 102 to capture the video stream to be encoded.

Figure 2:
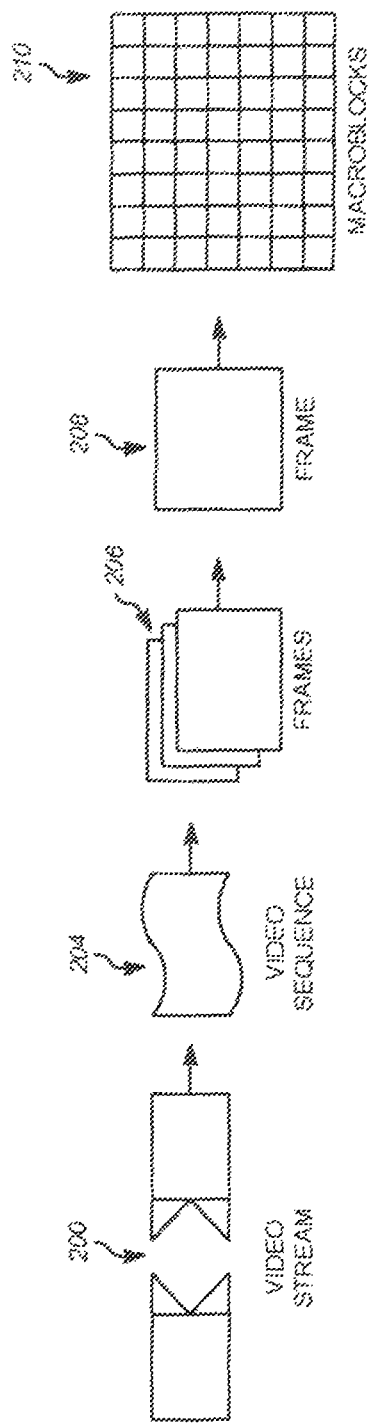
FIG. 2 is a diagram of an example video stream to be encoded and decoded in accordance with implementations of this disclosure.

FIG. 2 is a diagram of an example video stream 200 to be encoded and decoded. Video stream 200 (also referred to herein as video data) includes a video sequence 204. At the next level, video sequence 204 includes a number of adjacent frames 206. While three frames are depicted in adjacent frames 206, video sequence 204 can include any number of adjacent frames. Adjacent frames 206 can then be further subdivided into individual frames, e.g., a single frame 208. Each frame 208 can capture a scene with one or more objects, such as people, background elements, graphics, text, a blank wall, or any other information.

At the next level, single frame 208 can be divided into a set of blocks 210, which can contain data corresponding to, in some of the examples described below, a 8×8 pixel group in frame 208. Block 210 can also be of any other suitable size such as a block of 16×8 pixels, a block of 8×8 pixels, a block of 16×16 pixels, a block of 4×4 pixels, or of any other size. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
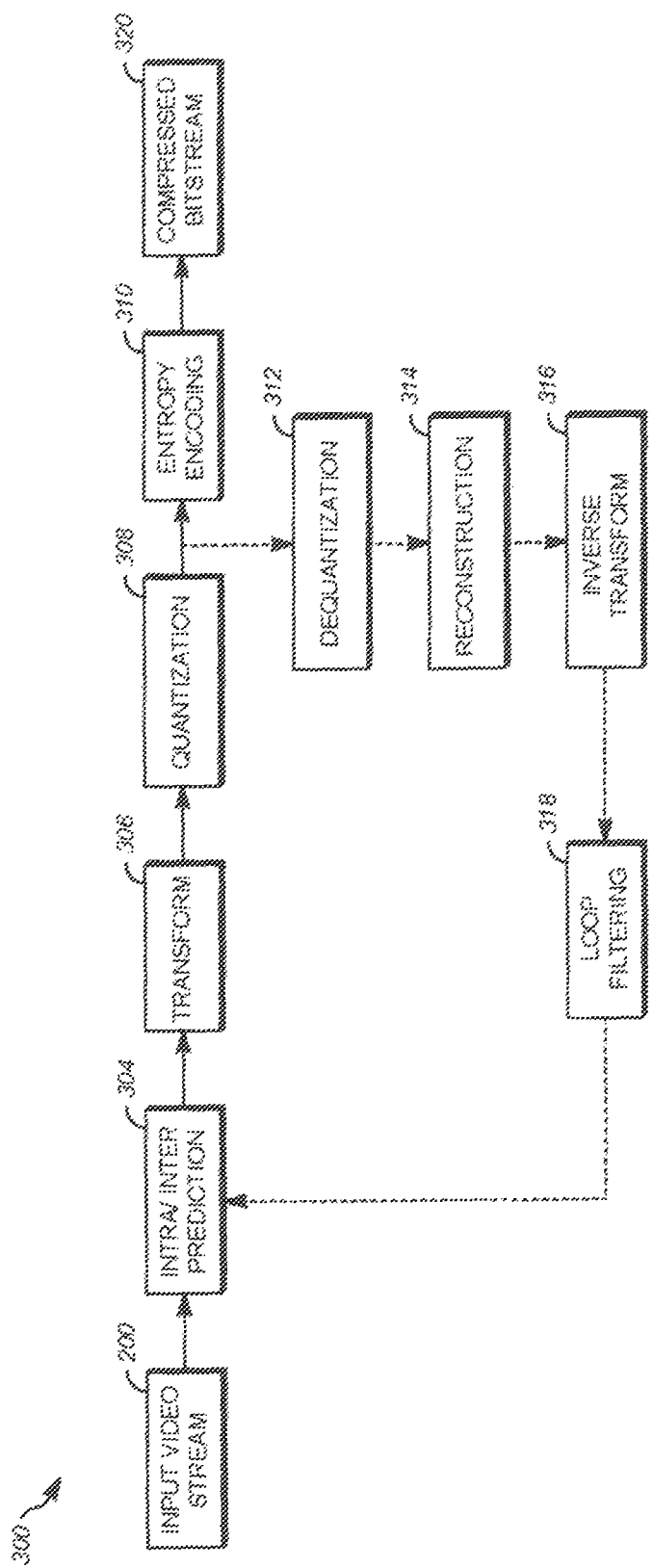
FIG. 3 is a block diagram of a video compression system in accordance with implementations of this disclosure.

FIG. 3 is a block diagram of an encoder 300 in accordance with implementations of this disclosure. Encoder 300 can be implemented, as described above, in transmitting station 102 such as by providing a computer software program stored in memory 106, for example. The computer software program can include machine instructions that, when executed by CPU 104, cause transmitting station 102 to encode video data in the manner described in FIG. 3. Encoder 300 can also be implemented as specialized hardware in, for example, transmitting station 102. Encoder 300 has the following stages to perform the various functions in a forward path (shown by the solid connection lines) to produce an encoded or a compressed bitstream 320 using input video stream 200: an intra/inter prediction stage 304, a transform stage 306, a quantization stage 308, and an entropy encoding stage 310. Encoder 300 may include a reconstruction path (shown by the dotted connection lines) to reconstruct a frame for encoding of future blocks. In FIG. 3, encoder 300 has the following stages to perform the various functions in the reconstruction path: a dequantization stage 312, an inverse transform stage 314, a reconstruction stage 316, and a loop filtering stage 318. Other structural variations of encoder 300 can be used to encode video stream 200.

When video stream 200 is presented for encoding, each frame 208 within video stream 200 can be processed in units of blocks. Referring to FIG. 3, at intra/inter prediction stage 304, each block can be encoded using either intra prediction (i.e., within a single frame) or inter prediction (i.e. from frame to frame). In either case, a prediction block can be formed. The prediction block is then subtracted from the block to produce a residual block (also referred to herein as residual).

Intra prediction (also referred to herein as intra-prediction or intra-frame prediction) and inter prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously constructed reference frames, such as the last frame (i.e., the adjacent frame immediately before the current frame), the golden frame or the constructed or alternate frame described above.

The prediction block is then subtracted from the current block. The difference, or residual, is then encoded and transmitted to decoders. Image or video codecs may support many different intra and inter prediction modes; each block may use one of the prediction modes to obtain a prediction block that is most similar to the block to minimize the information to be encoded in the residual so as to re-create the block. The prediction mode for each block of transform coefficients can also be encoded and transmitted so a decoder can use the same prediction mode(s) to form prediction blocks in the decoding and reconstruction process.

The prediction mode may be selected from one of multiple intra-prediction modes. Alternatively, the prediction mode may be selected from one of multiple inter-prediction modes using one or more reference frames including, for example, last frame, golden frame, alternative reference frame, or any other reference frame in an encoding scheme. The bitstream syntax supports three categories of inter prediction modes. The inter prediction modes can include, for example, a mode (sometimes called ZERO_MV mode) in which a block from the same location within a reference frame as the current block is used as the prediction block; a mode (sometimes called a NEW_MV mode) in which a motion vector is transmitted to indicate the location of a block within a reference frame to be used as the prediction block relative to the current block; or a mode (sometimes called a REF_MV mode comprising NEAR_MV or NEAREST_MV mode) in which no motion vector is transmitted and the current block uses the last or second-to-last non-zero motion vector used by neighboring, previously coded blocks to generate the prediction block. Inter-prediction modes may be used with any of the available reference frames.

The reference motion vector coding modes analyze the available blocks motion activity to produce a ranked reference motion vector candidate list, allowing the size of the reference motion vector modes to be dynamically extended, a generalization of the fixed NEAREST_MV mode and NEAR_MV mode, and improving the efficacy of entropy coding. REF_MV mode represents reference motion vector modes, including NEAR_MV and NEAREST_MV modes, as well as extended modes when the candidate motion vector list shows sufficient variation. The entropy coding system starts with NEW_MV mode, selecting the probability model according to the contexts of the number of reference motion vectors found and, if a neighboring block with matched reference frame is found, determining the likelihood that the neighboring block is coded in NEW_MV mode. If the coding mode is not NEW_MV mode, the codec continues to code if the mode is ZERO_MV mode. The codec selects the mode probability model according to the contexts when the collocated block in the previous frame is using a zero motion vector, or close to zero motion vector (i.e., less than 1 full pixel in both row and column components), or when the spatial neighboring blocks are using zero, or close to zero, motion vectors. If the coding mode is not ZERO_MV mode, the codec decides between the REF_MV modes. The associated context is how many reference motion vectors checked into the candidate list and the weighing coefficients. The REF_MV mode syntax suggests that the effective motion vector comes from referring neighboring blocks coding information. Given the reference frame, a list of such possible reference motion vector candidates includes reference motion vector candidates that are ranked according to their relative distance to the current block and the overlapped amount. The codec needs to decode which one in the list to pick and use. The codec can select the candidate motion vector among the candidate motion vectors in the list that would provide the best prediction and send the index associated with that particular candidate motion vector to the decoder.

Next, still referring to FIG. 3, transform stage 306 transforms the residual into a block of transform coefficients in, for example, the frequency domain. Examples of block-based transforms include the Karhunen-Loève Transform (KLT), the Discrete Cosine Transform (DCT), Walsh-Hadamard Transform (WHT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

Quantization stage 308 converts the block of transform coefficients into discrete quantum values, which are referred to as quantized transform coefficients, using a quantizer value or quantization level. The quantized transform coefficients are then entropy encoded by entropy encoding stage 310. The entropy-encoded coefficients, together with other information used to decode the block, which can include for example the type of prediction used, motion vectors and quantization value, are then output to compressed bitstream 320. Compressed bitstream 320 can be formatted using various techniques, such as variable length encoding (VLC) and arithmetic coding. Compressed bitstream 320 can also be referred to as an encoded video stream and the terms will be used interchangeably herein.

The reconstruction path in FIG. 3 (shown by the dotted connection lines) can be used to provide both encoder 300 and a decoder 400 (described below) with the same reference frames to decode compressed bitstream 320. The reconstruction path performs functions that are similar to functions that take place during the decoding process that are discussed in more detail below, including dequantizing the quantized transform coefficients at dequantization stage 312 to generate dequantized transform coefficients and inverse transforming the dequantized transform coefficients at inverse transform stage 314 to produce a derivative residual block (i.e., derivative residual). At reconstruction stage 316, the prediction block that was predicted at intra/inter prediction stage 304 can be added to the derivative residual to create a reconstructed block. In some implementations, loop filtering stage 318 can be applied to the reconstructed block to reduce distortion such as blocking artifacts.

Other variations of encoder 300 can be used. For example, a non-transform based encoder 300 can quantize the residual block directly without transform stage 306. In another implementation, an encoder 300 can have quantization stage 308 and dequantization stage 312 combined into a single stage.

Figure 4:
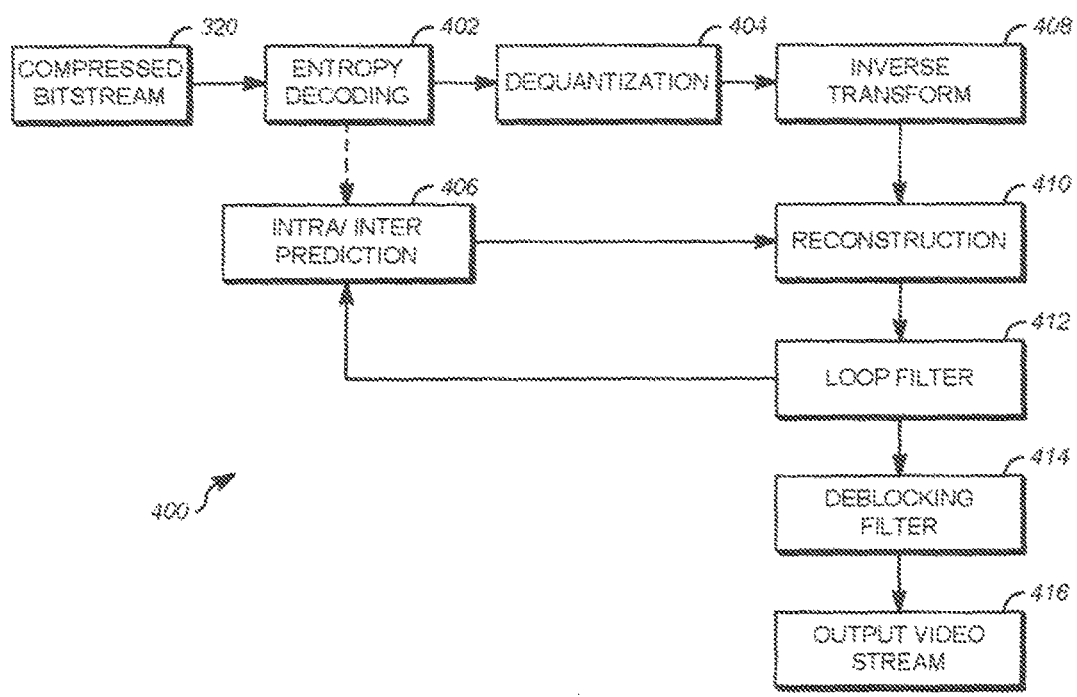
FIG. 4 is a block diagram of a video decompression system in accordance with implementations of this disclosure.

FIG. 4 is a block diagram of a decoder 400 in accordance with implementations of this disclosure. Decoder 400 can be implemented, for example, in receiving station 110, such as by providing a computer software program stored in memory for example. The computer software program can include machine instructions that, when executed by CPU 112, cause receiving station 110 to decode video data in the manner described in FIG. 4. Decoder 400 can also be implemented as specialized hardware or firmware in, for example, transmitting station 102 or receiving station 110.

Decoder 400, similar to the reconstruction path of encoder 300 discussed above, includes in one example the following stages to perform various functions to produce an output video stream 416 from compressed bitstream 320: an entropy decoding stage 402, a dequantization stage 404, an inverse transform stage 406, an intra/inter prediction stage 408, a reconstruction stage 410, a loop filtering stage 412, and a deblocking filtering stage 414. Other structural variations of decoder 400 can be used to decode compressed bitstream 320.

When compressed bitstream 320 is presented for decoding, the data elements within compressed bitstream 320 can be decoded by the entropy decoding stage 402 (using, for example, arithmetic coding) to produce a set of quantized transform coefficients. Dequantization stage 404 dequantizes the quantized transform coefficients and inverse transform stage 406 inverse transforms the dequantized transform coefficients to produce a derivative residual that can be identical to that created by reconstruction stage 316 in encoder 300. Using header information decoded from compressed bitstream 320, decoder 400 can use intra/inter prediction stage 408 to create the same prediction block as was created in encoder 300, e.g., at intra/inter prediction stage 304. In the case of inter prediction, the reference frame from which the prediction block is generated may be transmitted in the bitstream or constructed by the decoder using information contained within the bitstream.

At reconstruction stage 410, the prediction block can be added to the derivative residual to create a reconstructed block that can be identical to the block created by reconstruction stage 316 in encoder 300. In some implementations, loop filtering stage 412 can be applied to the reconstructed block to reduce blocking artifacts. Deblocking filtering stage 414 can be applied to the reconstructed block to reduce blocking distortion, and the result is output as output video stream 416. Output video stream 416 can also be referred to as a decoded video stream and the terms will be used interchangeably herein.

Other variations of decoder 400 can be used to decode compressed bitstream 320. For example, decoder 400 can produce output video stream 416 without deblocking filtering stage 414.

Figure 5:
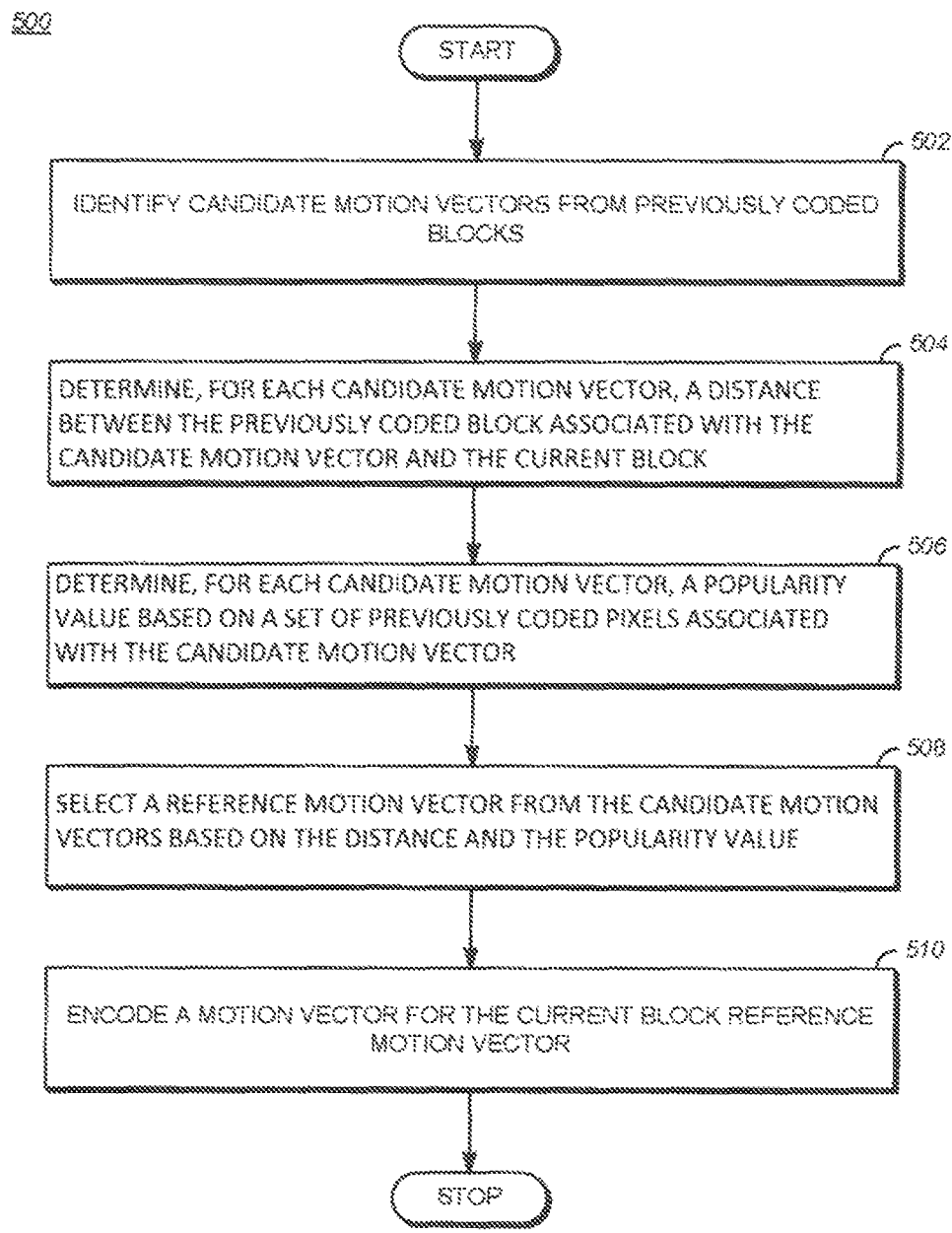
FIG. 5 is a flow diagram of a process for encoding a video stream using reference motion vectors in accordance with an implementation of this disclosure.

FIG. 5 is a flow diagram showing a process 500 for encoding a video stream using reference motion vectors in accordance with an implementation of this disclosure. Process 500 can be implemented in an encoder such as encoder 300 (shown in FIG. 3) and can be implemented, for example, as a software program that can be executed by computing devices such as transmitting station 102 or receiving station 110 (shown in FIG. 1). For example, the software program can include machine-readable instructions that can be stored in a memory such as memory 106 or memory 114, and that can be executed by a processor, such as CPU 104, to cause the computing device to perform process 500.

Process 500 can be implemented using specialized hardware or firmware. Some computing devices can have multiple memories, multiple processors, or both. The steps of process 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps. For simplicity of explanation, process 500 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Process 500 assumes that a stream of video data having multiple frames, each having multiple blocks, is being encoded using a video encoder such as video encoder 300 executing on a computing device such as transmitting station 102. The video data or stream can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder. At least some of the blocks within frames are encoded using inter prediction as described in more detail below.

At step 502, process 500 identifies candidate motion vectors from previously coded blocks in the video stream. Process 500 analyzes the motion activity of previously coded blocks to produce a list of ranked candidate motion vectors, employing an efficient reference motion vector ranking system, and provides a dynamic motion referencing mode that fully accounts for the available motion vector candidate list, which allows the number of the reference motion vector modes to be dynamically extended or shortened and improves the efficacy of entropy coding. The pool of the candidate motion vectors can be dynamically extended or shortened according to the neighboring reference block condition, i.e., how the list of candidate motion vectors is created. The previously coded blocks in the video stream can include any block encoded using inter-prediction before the current block, such as a block from a previously coded frame or a block from the same frame as the current block that has been encoded before the current block. For example, in some encoding/decoding (codec) schemes such as ones that code in raster scan order, the previously coded blocks can include a block above, to the left, or to the above-left of the current block in the same frame. The previously coded blocks can also include, for example, a block from the immediately previous frame (i.e., last frame), a block from the golden frame (described at intra/inter prediction stage 304), a block from any other reference frame, or any combination thereof. Desirably, however, the candidate motion vectors are obtained from previously coded blocks that correspond in some way to the current block based on the theory that such blocks, due to the proximity of their pixels to the current block, are likely to have similar motion characteristics to the current block.

Blocks may be predicted from a single reference frame or compound, such as two, reference frames. For blocks with a single reference frame, process 500 identifies candidate motion vectors from the nearest spatial neighboring blocks that are associated with the reference frame. The candidate motion vectors may include the motion vector reference blocks within a reference coverage area, such as the motion vector from a block above the current block, the motion vector from a block to the left of the current block, the motion vector from a block to the above-right of the current block, and the motion vector of a collocated block in the previous frame.

Process 500 determines, for each candidate motion vector, a distance between the previously coded block associated with the candidate motion vector and the current block at step 504. The candidate motion vectors are ranked based on the distance, from nearest to furthest, from the previously coded block and the overlapped length between the previously coded block and the current block. The nearest candidate motion vector from the block above the current block, the nearest candidate motion vector from a block to the left of the current block, and the nearest candidate motion vector from the above-right of the current block are considered to be category 1 candidate motion vectors. Due to the proximity of the previously coded block to the current block, it is possible that the current block has similar motion characteristics as the previously coded block. The remaining candidate motion vectors are considered to be category 2 candidate motion vectors. Category 1 candidate motion vectors always assume a higher priority than category 2 candidate motion vectors.

Process 500 determines, for each candidate motion vector within category 1 and category 2, a popularity value based on a set of previously coded pixel values associated with the particular candidate motion vector at step 504. Within each category, the candidate motion vectors are ranked according to their popularity value, with category 1 candidate motion vectors always ranking higher than category 2 candidate motion vectors. The larger the number of previously coded pixel values associated with the candidate motion vector, the higher the popularity value of the candidate motion vector. At step 508, a reference motion vector can be selected from the candidate motion vectors identified in step 504, based on the candidate motion vector nearest the current block and having the highest popularity value. The motion vector of the current block can be encoded using the reference motion vector in step 510 before processing begins again for the next block of the current frame. In addition, the current block can be encoded according to the process described with respect to FIG. 3.

Blocks can be predicted from two reference frames, where the prediction will be the average of the two frames. In some cases, the average can be a weighted average. For blocks with compound reference frames, process 500 finds the reference blocks that share the most reference frames with the current block. Process 500 identifies and assigns a higher priority to candidate motion vectors from neighboring reference blocks that share the same reference frame combination. When there are less than two identified candidate motion vectors, process 500 identifies additional combinations of candidate motion vectors from blocks with single reference frames, as described above.

Process 500 determines, for each candidate motion vector, a distance between the previously coded block associated with the candidate motion vector and the current block at step 504. For example, the distance between the previously coded block associated with the candidate motion vector and the current block can be based on the spatial displacement between the pixels in the previously coded block and the collocated pixels in the current block, measured in the unit of pixels. The candidate motion vectors are ranked based on the distance, from nearest to furthest, from the previously coded block to the current block and the overlapped length between the previously coded block and the current block. The nearest candidate motion vector from the block above the current block, the nearest candidate motion vector from a block to the left of the current block, and the nearest candidate motion vector from the above-right of the current block are considered to be category 1 candidate motion vectors. The remaining candidate motion vectors are considered to be category 2 candidate motion vectors.

Process 500 determines, for each candidate motion vector identified in step 502, a popularity value based on a set of previously coded pixel values associated with the candidate motion vector at step 506. A popularity value is determined for each compound candidate motion vector, each category 1 candidate motion vector, and each category 2 candidate motion vector. The candidate motion vectors are then ranked according to a priority value based on their popularity value, with candidate motion vectors that share the same compound reference frames having a higher priority than category 1 candidate motion vectors and category 1 candidate motion vectors having a higher priority than category 2 candidate motion vectors. The larger the number of previously coded pixel values associated with the candidate motion vector, the higher the popularity value of the candidate motion vector. At step 508, a reference motion vector can be selected from the candidate motion vectors identified in step 506, based on the candidate motion vector having the highest priority. The motion vector of the current block can be encoded using the reference motion vector in step 510 before processing begins again for the next block of the current frame. In addition, the current block can be encoded according to the process described with respect to FIG. 3. Using the most popular candidate motion vector, i.e., the candidate motion vector used by the most pixels in the reference coverage area comprising neighboring blocks, reduces the overall number of motion vectors that need to be encoded, improving the prediction accuracy of reference motion vectors and providing a further level of optimization and bandwidth efficiency.

Figures 6, 7:
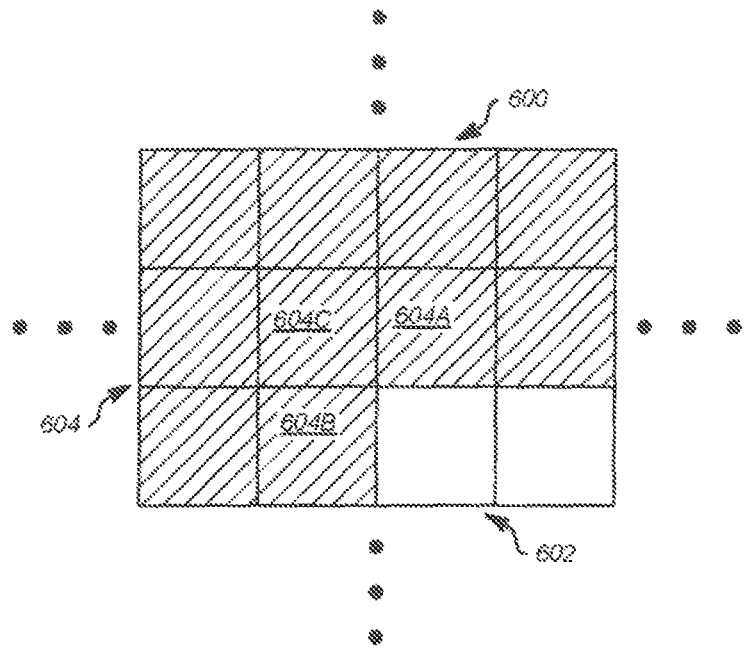
FIG. 6 is a diagram of a frame including a current block used to explain the process of FIG. 5.
FIG. 7 is a diagram of the current block of FIG. 6 and a set of previously coded pixel.

FIG. 6 is a diagram of a frame 600 including a current block 602 used to explain the process of FIG. 5. Frame 600 includes blocks that have been encoded before current block 602, such as the shaded blocks 604 to the left of or above current block 602 in FIG. 6. In this example where encoding is performed in raster scan order, the candidate motion vectors may include the motion vector from a block 604A above current block 602, the motion vector from a block 604B to the left of current block 602 and the motion vector from a block 604C to the above-left of current block 602. If any of blocks 604A, 604B or 604C were not intra predicted, they would not have a motion vector to contribute to the candidate motion vectors. The candidate motion vectors can also include motion vectors from other frames as illustrated by FIGS. 10 and 11.

Figure 10:
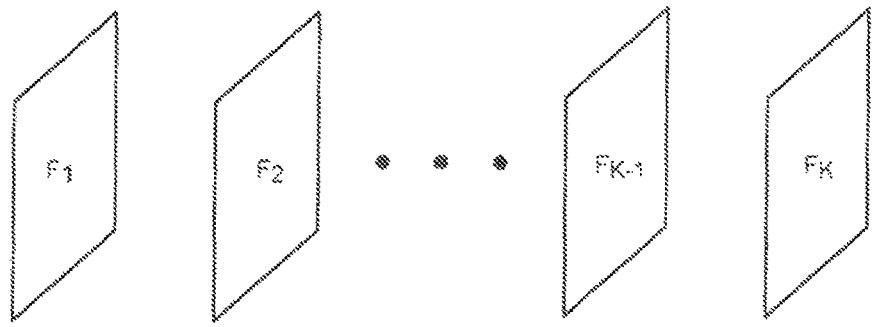
FIG. 10 is a diagram of a series of frames of a first video stream in accordance with an implementation of this disclosure.
Figure 11:
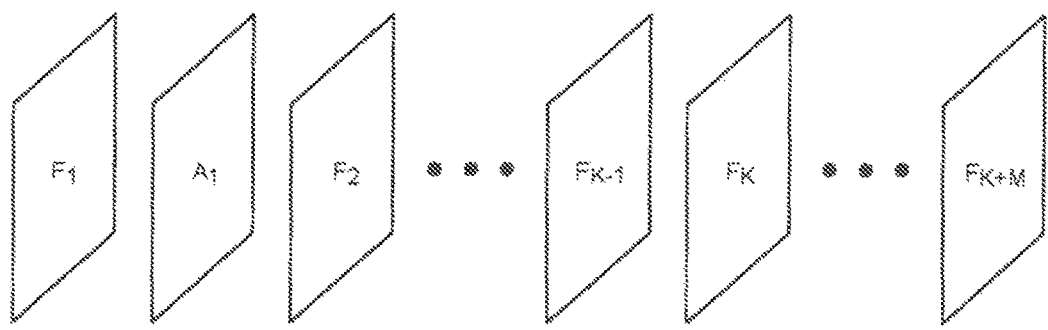
FIG. 11 is a diagram of a series of frames of a second video stream in accordance with an implementation of this disclosure.

FIG. 10 is a diagram of a series 1000 of frames $F_1$, $F_2 \ldots F_{k-1}$, $F_k$ of a first video stream in accordance with an implementation of this disclosure. Frame $F_k$ is the current frame to be encoded following encoding and reconstructing frames $F_1$, $F_2 \ldots F_{k-1}$. Frame $F_k$ includes the current block referred to in FIG. 5, for example. Frame $F_{k-1}$ is temporally adjacent to frame $F_k$, while frames $F_1$ and $F_2$ are temporally non-adjacent to frame $F_k$. A frame (e.g., a reference frame) is temporally non-adjacent to another frame when the frames are separated within a temporal sequence of the plurality of frames of the video stream by at least one frame. Among these video frames, reconstructed frame $F_2$ may be stored as a golden reference frame as discussed above. Frame $F_{k-1}$ is the reconstructed frame stored in a "last" reference frame buffer available for coding blocks of current frame $F_k$. When encoding frame $F_2$, frame $F_1$ was used as the "last" reference frame. A block that spatially corresponds to the current block in last frame $F_{k-1}$ may be used to obtain a motion vector for the candidate motion vectors in step 502. That is, a motion vector used for the prediction of the block in last frame $F_{k-1}$ at the same pixel location as the current block may be added to the candidate motion vectors. Motion vectors from other blocks in last frame $F_{k-1}$, such as those adjacent to the same pixel location as the current block, may also be used as candidate motion vectors in some cases. Pixel locations may be designated by X- and Y-coordinates with the top-left pixel designated as position (0,0) for example.

In the example of FIG. 10, frame $F_2$ is a golden frame available for inter prediction of blocks in current frame $F_k$.

Therefore, one or more of the adjacent blocks to the current block in frame $F_k$ may refer to frame $F_2$ such that its motion vector is included among the candidate motion vectors. Further, one or more motion vectors used for the prediction of the blocks in golden frame $F_2$ may also be added to the candidate motion vectors. For example, a dominant motion vector of the frame could be selected. In some cases, motion vectors of inter predicted blocks in golden frame $F_2$ within a specified spatial neighborhood of, for example, the same pixel position as the current block may be used as candidate motion vectors. Flags may be associated with frame $F_k$ (such as bits in its header) to indicate that a motion vector used in coding frame $F_2$ (e.g., against frame $F_1$) is available to some blocks in frame $F_k$ as a candidate motion vector.

FIG. 11 is a diagram of a series 1100 of frames $F_1$, $A_1$, $F_2$, .... $F_{k-1}$, $F_k$, ... $F_{k+m}$ of a second video stream in accordance with an implementation of this disclosure. Series 1100 is similar to series 1000 but includes an alternate reference frame $A_1$. Alternate reference frames may be purely constructed frames and, as such, may not have the same dimensions as the remaining frames in series 1100. For simplicity in this explanation, it is assumed that frame A1 resembles a future video frame $F_{k+m}$. When encoding frame $A_1$, motion vectors may be used against reference frame $F_1$, for example. When it is time to encode frame $F_k$, a motion vector from encoded and reconstructed frame $A_1$ can now be selected and identified to be used as a candidate motion vectors in encoding one or more blocks in frame $F_k$. As discussed in the example given above with respect to golden frame $F_2$, a motion vector to be included in the candidate motion vectors may be one associated with a spatially corresponding block of alternate reference frame $A_1$ or one associated with another nearby block. Further, any of the blocks adjacent to the current block in frame $F_k$ may refer to frame $A_1$ such that the corresponding motion vector is included among the candidate motion vectors.

FIG. 7 is a diagram of the current block 602 of FIG. 6 and a set 702 of previously coded pixels. Set 702 can include, for example, two rows 702A, 702B of pixels immediately above current block 602 and two columns 702C, 702D of pixels to the immediate left of current block 602. However, other previously coded pixels (not shown in FIG. 7) can also be used. Rows 702A, 702B are associated with block 604A, while columns 702C, 702D are associated with block 604B. Blocks, such as current block 602 and previously coded blocks 604A, 604B, are shown in FIG. 7 to have a set of 8×8 pixels, which can be represented by an 8×8 matrix of pixel values. However, any other block size can be used. When a block is formed by a matrix of 16×16 pixels, for example, a 16×2 region from the block above and a 2×16 region from the block to the left of the current block may be used. The number of pixels can be altered to include fewer or more pixels.

A popularity value can be determined for each candidate motion vector based on how many previously coded pixels in the reference coverage area use that particular candidate motion vector. The more previously coded pixels that use a particular candidate motion vector, the higher the popularity value will be for that particular candidate motion vector. Step 506 can be implemented, for example, at intra/inter prediction stage 304 of encoder 300 in FIG. 3, and one implementation is explained using FIG. 8.

Figure 8:
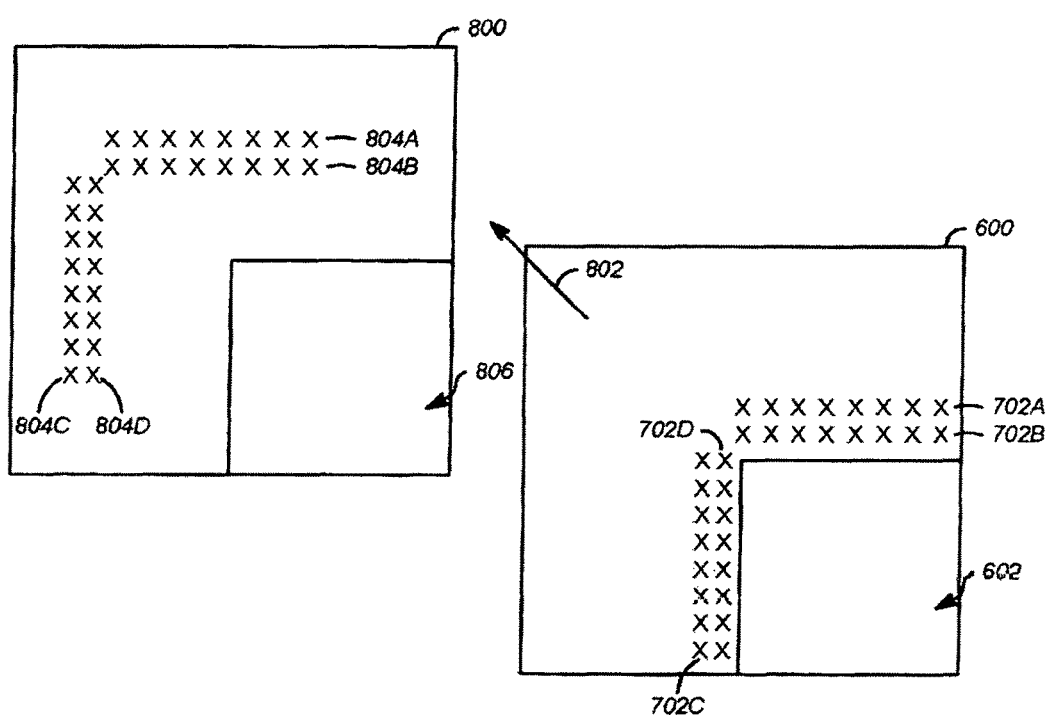
FIG. 8 is a diagram of a set of predicted pixels for the set of previously coded pixels of FIG. 7.

FIG. 8 is a diagram of a set 702 of predicted pixels for the set of previously coded pixels of FIG. 7. In FIG. 8, current block 602 of current frame 600 is being encoded. The set of predicted values is determined using a candidate motion vector (indicated generally by arrow 802) identified at step 502. The set 702 of previously coded pixels include, for example, two rows 702A, 702B and two columns 702C, 702D described above with reference to FIG. 7. To form the set of predicted values using candidate motion vector 802, rows 702A, 702B can be predicted by rows 804A, 804B in a reference frame 800 and columns 702C, 702D can be predicted by columns 804C, 804D in reference frame 800. That is, using the X- and Y-offsets provided by candidate motion vector 802, a set of predicted pixels represented by rows 804A, 804B and columns 804C, 804D in reference frame 800 is identified. In FIG. 8, block 806 is shown in the same spatial position in reference frame 800 as current block 602 is in current frame 600 to illustrate the pixels of rows 804A, 804B and columns 804C, 804D selected as the prediction pixels based on the candidate motion vector.

The reference frame used for the identification of the prediction values in step 506 may be a temporally adjacent frame (such as last frame $F_{k-1}$) or a temporally non-adjacent frame (such as golden frame $F_2$ or alternate frame $A_1$). Desirably, each available reference frame is used as part of a rate-distortion loop within an encoder that determines the best coding mode for the current block by comparing the rate (e.g., the bit cost) of each coding mode with the resulting image distortion (e.g., the change in image due to the coding) for each tested mode. However, since the candidate motion vectors may be generated using frames separated by different temporal distances than the current frame and the particular reference frame under consideration. Accordingly, step 506 also includes scaling candidate motion vectors where needed, which is described by reference again to FIGS. 10 and 11.

Scaling up or down a motion vector so that it may be applied as a candidate motion vector means adjusting its magnitude. The magnitude of the candidate can be scaled depending upon the results of comparing the temporal distance and direction between the reference frame and the frame including the current block and the temporal distance and direction used to form the candidate motion vector. The temporal distance between frames can be determined by their respective positions in the video stream. For example, when a candidate motion vector is a motion vector that was used to encode a block of frame $F_2$ against frame $F_1$, the magnitude of the motion vector can be used directly for encoding frame $F_k$ against reference frame $F_{k-1}$ since frames $F_k$ and $F_{k-1}$ are, like frames $F_1$ and $F_2$, a frame apart temporally (that is, they are adjacent frames in the frame sequence). In contrast, a candidate motion vector from $F_{k-1}$ and previous coded blocks of $F_k$ when a block of $F_k$ was encoded using the golden frame, i.e., $F_2$ in this FIGS. 10 and 11, needs to be scaled to take into account the difference of temporal distance before being used to generate the prediction pixels in step 506. For example, a motion vector used in previously coding a block of current frame $F_k$ against $F_{k-1}$ will be scaled up using a factor proportional to k−2 to become a candidate motion vector for generation of the prediction pixels when the current block, such as block 602 of FIG. 8, is in evaluation to be coded against reference frame $F_2$. Scaling up or down a motion vector so that it may be applied as a candidate motion vector means adjusting its magnitude. The magnitude of the candidate can be scaled depending upon the results of comparing the temporal distance and direction between the reference frame and the frame including the current block and the temporal distance and direction used to form the candidate motion vector.

An alternate reference frame such as frame $A_1$ may be treated similarly to other references frames, such as the last or golden reference frame. However, since an alternate reference frame may be constructed using portions of multiple frames from multiple temporal positions in the video stream, techniques may be used to determine a temporal position in the video stream that most closely matches the image data included in the alternate frame.

This can be explained further using an example from FIG. 11 assuming the use of a candidate motion vector used to predict a block in $F_k$ from frame $A_1$ to generate prediction pixels for analysis of the current block using reference frame $F_{k-1}$. Because the distance in frames between $F_1$ and $A_1$, where $A_1$ actually resembles frame $F_{k+m}$, is k+m−1, the motion vector magnitude may be divided by k+m−1 before using the candidate motion vector to generate the prediction pixels. This is because the distance between frames $F_k$ and $F_{k-1}$ is less than the distance k+m−1, therefore the motion vector has to scaled down to approximate the motion between frames $F_k$ and $F_{k-1}$. In cases where the motion vectors are taken from frames temporally close together and used to form inter prediction pixels from frames with greater temporal separation, the motion vectors can be multiplied by a scaling factor proportional to the ratio of the two temporal distances.

At step 508, a reference motion vector can be selected from the candidate motion vectors identified at step 506. For blocks using a single reference frame, the selection can be based on, for example, selecting the motion vector from the candidate motion vectors associated with the highest popularity value and associated with the reference block closest to the current block. For blocks using compound reference frames, the selection can be based on, for example, the motion vector from reference blocks that share the same reference frame combination with higher priority. When less than two candidate motion vectors are identified, the candidate motion vectors in compound reference frames can be appended with the combinations of reference motion vectors of single reference frames. Other selection criteria can also be used. The reference motion vector can be used for further processing. Namely, the motion vector of the current block can be encoded using the reference motion vector in step 510 before processing begins again for the next block of the current frame. In addition, the current block can be encoded according to the process described with respect to FIG. 3.

There are several ways to use the reference motion vector in encoding the motion vector of the current block. For example, and as described above, process 500 may be part of a rate-distortion loop used to select the inter prediction mode for the current block to be encoded. As part of the rate-distortion loop, the actual motion vector for inter prediction of the current block may be determined through a motion search according to any number of techniques. One use of the reference motion vector may include using the reference motion vector as a starting parameter for the motion search algorithm based on the reasoning that the actual motion vector is likely to be close to those used in selecting the reference motion vector. A motion search may alternatively be performed before or in parallel with process 500.

Whether or not the reference motion vector is incorporated into the motion search, step 510 may include using the reference motion vector to differentially encode the actual motion vector. For example, a difference value can be calculated by subtracting the reference motion vector from the motion vector used to encode the current block. The difference value can be encoded and included in the video stream. Since the reference motion vector was formed using previously encoded and decoded data, the same data can be available at a decoder to identify the same reference motion vector as was used in forming the motion vector at the encoder, thus no motion vector is required to be encoded and transmitted for the current block. The decoded difference value can be added to the reference motion vector identified by the decoder as described below to form a motion vector to decode the current block. Note that the reference motion vector is associated with one of the available reference frames. Therefore, in the event the reference motion vector is associated with a reference frame that is different from the reference frame associated with the actual motion vector, the reference motion vector may be scaled as described previously so as to generate the difference between the reference motion vector and the actual motion vector. In some implementations, a separate indication of the reference frame used would also be encoded into the bitstream.

In another implementation, the reference motion vector may be used to choose a probability distribution to encode the magnitude of the motion vector used to encode the current block. In this implementation, bits can be included in the video stream to identify the encoded magnitude of the motion vector and which predetermined probability distribution to use to form the motion vector based on the encoded magnitude. One or more bits indicating which reference frame to use in decoding the current block may also be included in the bitstream in some variations. Like its use in differential encoding, the reference motion vector may also be scaled to the extent it is desirable.

In an implementation, the reference motion vector may also be used directly in the encoding of the current block. This can occur, for example, when a comparison of the rate-distortion value involved in coding the current block using the motion vector determined by the motion search is higher than that involved in coding the current block using the reference motion vector. In this comparison, the reference frame used would desirably be the one used in selecting the reference motion vector so no scaling is needed. In some cases, the decision as to whether or not to use the reference motion vector may be tied to the difference between the reference motion vector and the motion vector resulting from the search. When the difference is small (or zero), the difference in prediction results for the reference frame resulting from the search using the reference motion vector versus the actual motion vector is also small (or zero). When the reference motion vector is used directly to encode the current block, no motion vector would need to be separately encoded at step 510. Instead, one or more bits would be inserted into the bitstream in association with the current block to indicate use of the reference motion vector for encoding.

In each of the above ways, the use of a reference motion vector may reduce the number of bits needed to represent the motion vector needed to decode an inter coded block. In some cases, the motion vector used for encoding the current frame would not be done separately. Using the most popular motion vector reduces the overall number of motion vectors, which in turn reduces the number of motion vectors that need to be encoded and placed in the bitstream. Bits may be inserted into frame, slice and/or block headers indicating whether reference motion vectors are used and how they are used for encoding the current block. When applicable, the motion vector found by the motion search or the motion vector differential and/or the reference frame used in encoding the current block are also transmitted.

Regardless of the motion vector used for encoding, a prediction block can be determined based on a reference frame by applying a candidate motion vector to the previously coded pixel values of the reference frame. The prediction block can be subtracted from the current block to form a residual that can be further encoded according to the processing described with respect to FIG. 3 and included in an encoded video bitstream.

Figure 9:
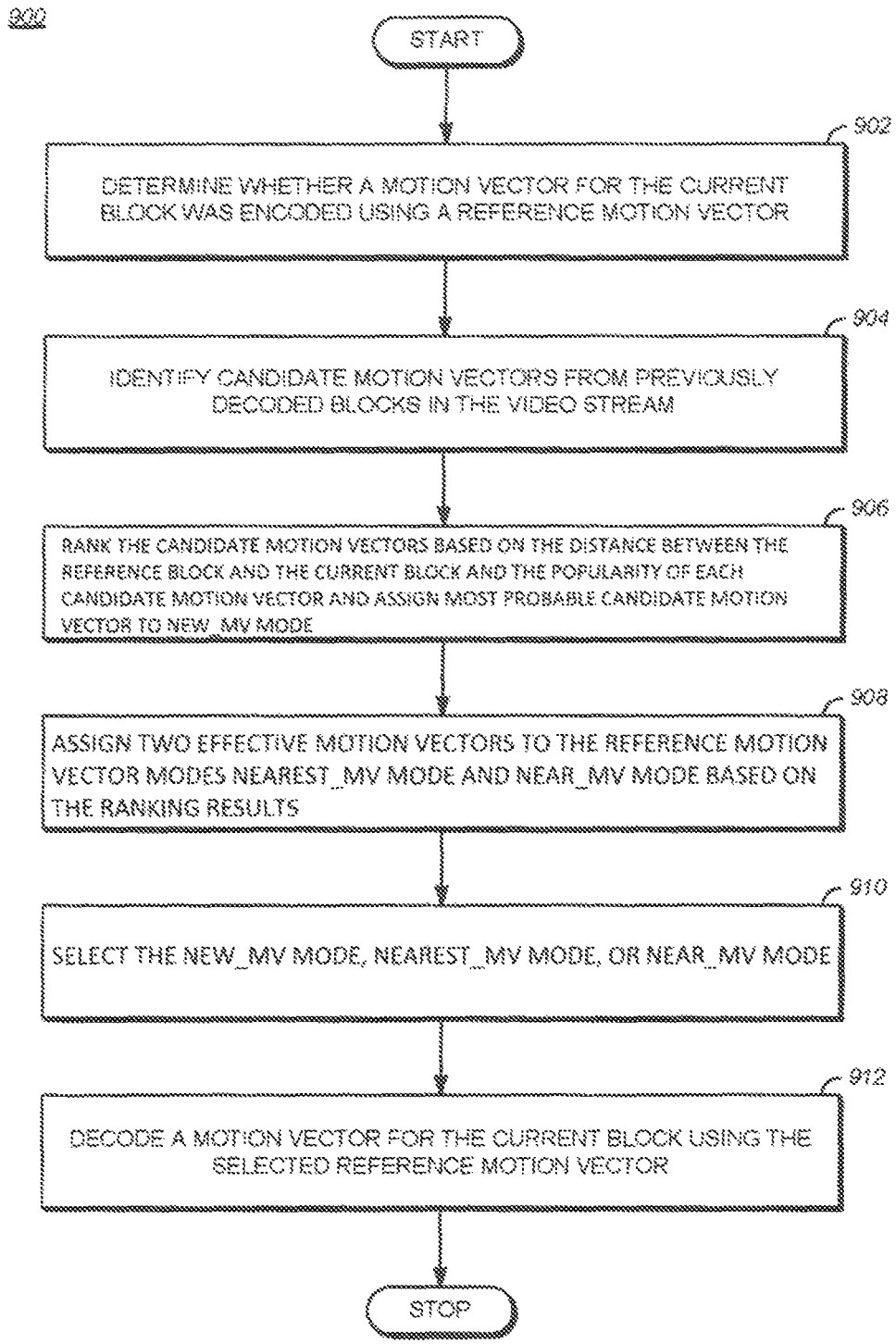
FIG. 9 is a flow diagram of a process for decoding an encoded video stream using reference motion vectors in accordance with implementations of this disclosure.

FIG. 9 is a flow diagram of a process 900 for decoding an encoded video stream using reference motion vectors in accordance with implementations of this disclosure. The decoder can reproduce the same candidate motion vectors that were constructed in process 500, shown in FIG. 5. The decoder can read the index of the bitstream to determine which reference motion vector to use from the candidate motion vectors. Process 900 can be implemented, for example, as a software program that may be executed by computing devices such as transmitting station 102 or receiving station 110. For example, the software program can include machine-readable instructions that may be stored in a memory such as memory 106 or 114, and that, when executed by a processor, such as CPU 104 or 112, may cause the computing device to perform process 900. Process 900 can be implemented using specialized hardware or firmware. As explained above, some computing devices may have multiple memories or processors, and the steps of process 900 can be distributed using multiple processors, memories, or both.

For simplicity of explanation, process 900 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Desirably, process 900 substantially conforms to process 500. There are some differences, however, that are pointed out in the following description of process 900. Where steps are substantially similar to those in process 500, reference will be made to the description above.

At step 902, the decoder determines whether the motion vector for the current block was encoded using a reference motion vector, the reference frame, and whether single or compound prediction was used. This information can be communicated by reading and decoding bits from an encoded video bitstream that indicate the use of a reference motion vector according to one of the techniques disclosed above. The encoded bitstream (or encoded video data) may have been received by decoder of a computing device in any number of ways, such as by receiving the video data over a network, over a cable, or by reading the video data from a primary memory or other storage device, including a disk drive or removable media such as a DVD, CompactFlash (CF) card, Secure Digital (SD) card, or any other device capable of communicating a video stream. Step 902 involves decoding at least a portion of the encoded video bitstream to extract the information regarding the motion vector for the current block. This information can be included in a header associated with a current block or a frame header, for example. The information in the one or more headers indicate to the decoder that the current block is to be decoded using inter prediction and that the motion vector used for that inter prediction relies on the reference motion vector as described previously. For example, information in the bitstream could indicate that the actual motion vector used in encoding the current block was differentially encoded using the reference motion vector. Alternatively, information could indicate that the reference motion vector was used directly for encoding the current block.

When a reference motion vector was used in the encoder to encode the motion vector for the current block, process 900 advances to step 904 to identify reference candidate motion vectors from the above and left neighbor blocks of the same reference frame. The identified candidate reference motion vectors should be the same as those identified by the encoder in step 502, which may be accomplished by flags as described previously and/or by a priori rules regarding the selection of candidate motion vectors that are available to both the encoder and decoder based on the position of the current block.

At step 906, the candidate reference motion vectors are ranked based on the distance between the reference block and the current block and the popularity of each candidate reference motion vector. The distance between the reference block and the current block is determined for each candidate reference motion vector. The popularity for each candidate reference motion vector is determined by a popularity value based on a set of previously coded pixel values associated with the particular candidate reference motion vector. The most probable candidate reference motion vector is assigned as the predicted motion vector for NEW_MV mode.

At step 908, two effective motion vectors are assigned to the REF_MV mode, comprising NEAREST_MV mode and NEAR_MV mode, based on their relative distance to the current block and the overlapped length between the reference block and the current block and their popularity value. If the list of candidate reference motion vectors includes more than two candidate reference motion vectors, the number of reference motion vector modes is dynamically extended. Step 910 process 900 determines whether to use NEW_MV mode or REF_MV mode. When REF_MV mode is selected, process 900 further determines whether to use NEAREST_MV mode or NEAR_MV mode.

Once the reference motion vector is selected, the motion vector used to encode the current block can be decoded using the selected reference motion vector at step 912. The decoded motion vector may then be used to decode the current block according to the process of FIG. 4.

In one example of the implementation of step 912, if the reference motion vector is used to differentially encode the actual motion vector for the current block, the decoder can decode the motion vector by, for example, decoding an encoded difference value that can then be added to the reference motion vector selected at step 910 to generate the actual motion vector. Then, the actual motion vector may be used to decode the current block using inter prediction. In other implementations, the reference motion vector can be used to identify a predetermined probability distribution, which can be used to decode a magnitude value of the motion vector used to encode the current block before decoding the current block using the motion vector. Similar to the discussion in step 510 of FIG. 5, this may involve scaling the reference motion vector. In other implementations, the reference motion vector may be used directly as the motion vector to decode the current block after decoding one or more bits indicating that the reference motion vector should be so used.

Once the motion vector and current block are decoded at step 912, the next block may be processed. In the next block is inter coded, process 900 may be repeated. A frame can be reconstructed from the blocks derived from reconstructed values by intra or inter prediction, or both. The output can be an output video stream, such as the output video stream 416 shown in FIG. 4.

According to the teachings herein, a reference motion vector may be selected so as to reduce the number of bits required to encode a motion vector determined by, for example, motion search techniques. The teachings herein take advantage of temporal motion continuity to reduce the number of bits required to transmit motion vector information by referring to motion vectors from adjacent and non-adjacent video frames. The decoder has all the information the encoder has to select the reference motion vector, allowing the selection of the reference motion vector without explicit transfer of further information.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 110 (and the algorithms, methods, instructions, etc., stored thereon and/or executed thereby, including by encoder 300 and decoder 400) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 110 do not necessarily have to be implemented in the same manner.

Further, in one aspect, for example, transmitting station 102 or receiving station 110 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 110 can, for example, be implemented on computers in a video conferencing system. Alternatively, transmitting station 102 can be implemented on a server and receiving station 110 can be implemented on a device separate from the server, such as a hand-held communications device. In this instance, transmitting station 102 can encode content using an encoder 300 into an encoded video signal and transmit the encoded video signal to the communications device. In turn, the communications device can then decode the encoded video signal using a decoder 400. Alternatively, the communications device can decode content stored locally on the communications device, for example, content that was not transmitted by transmitting station 102. Other suitable transmitting station 102 and receiving station 110 implementation schemes are available. For example, receiving station 110 can be a generally stationary personal computer rather than a portable communications device and/or a device including an encoder 300 may also include a decoder 400.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream, comprising:
    identifying, for respective previously coded blocks of a plurality of previously coded blocks, a candidate motion vector used to inter predict the previously coded block to define a plurality of candidate motion vectors;
    determining, using a processor, for each candidate motion vector of the plurality of candidate motion vectors, a distance between the previously coded block associated with the candidate motion vector and a current block of a current frame;
    determining, using the processor, for each candidate motion vector of the plurality of candidate motion vectors, a popularity value based on a set of previously coded pixels associated with the candidate motion vector;
    determining a first reference frame and a second reference frame for encoding the current block using compound prediction;
    ranking each candidate motion vector of the plurality of candidate motion vectors within a list of candidate reference motion vectors according to a priority value for each candidate motion vector, the priority value based on the distance and the popularity value associated with the candidate motion vector, wherein for encoding the current block using compound prediction, ranking each candidate motion vector comprises:
        determining reference blocks of the plurality of previously coded blocks that share the first reference frame and the second reference frame; and
        assigning a higher priority to candidate motion vectors from the reference blocks of the plurality of previously coded blocks that share a same combination of the first reference frame and the second reference frame within the list of candidate reference motion vectors than combinations of candidate motion vectors from others of the plurality of previously coded blocks encoded using respective single reference frames of the first reference frame and the second reference frame;
selecting, based on the priority values, a reference motion vector from the plurality of candidate motion vectors; and
encoding a motion vector for the current block using the reference motion vector.

2. The method of claim 1, further comprising:
assigning, as a predicted motion vector, a candidate motion vector within the list of candidate reference motion vectors having a highest priority value to a new motion vector coding mode that transmits a motion vector for inter prediction of the current block;
assigning, as a first reference motion vector, a candidate motion vector based on its position within the list of candidate reference motion vectors to a first reference motion vector coding mode that uses the first reference motion vector for inter prediction of the current block; and
assigning, as a second reference motion vector, a candidate motion vector based on its position within the list of candidate reference motion vectors to a second reference motion vector coding mode that uses the second reference motion vector for inter prediction of the current block, wherein selecting the reference motion vector comprises comparing a rate and image distortion of inter prediction of the current block using each of the new motion vector coding mode, the first reference motion vector coding mode, and the second motion vector coding mode, and selecting an inter-prediction mode for encoding the current block based on the comparing.

3. The method of claim 2, further comprising:
transmitting an index associated with the reference motion vector to a decoder.

4. The method of claim 1, further comprising:
dynamically extending or dynamically shortening the list of candidate reference motion vectors based on the plurality of candidate motion vectors.

5. The method of claim 1, wherein at least one of the plurality of previously coded blocks is in a reference frame that is temporally separated from the current frame within a sequence of the video and the plurality of previously coded blocks includes at least one of one or more blocks above the current block, one or more blocks to the left of the current block, one or more blocks to the above-right of the current block, or one or more blocks collocated with the current block.

6. The method of claim 5, wherein the plurality of candidate motion vectors comprises a first set of candidate motion vectors and a second set of candidate motion vectors, wherein each candidate motion vector of the first set of candidate motion vectors is associated with at least one of the one or more blocks above the current block, the one or more blocks to the left of the current block, or the one or more block to the above-right of the current block, and wherein each candidate motion vector of the first set of candidate motion vectors is associated with a higher priority value than each candidate motion vector of the second set of candidate motion vectors.

7. The method of claim 5, wherein the plurality of candidate motion vectors comprises a first set of candidate motion vectors associated with a set of previously coded blocks of the plurality of previously coded blocks, wherein each previously coded block of the set of previously coded blocks associated with a plurality of reference frames, and wherein each candidate motion vector of the first set of candidate motion vectors is associated with a higher priority value than each of the other candidate motion vectors of the plurality of candidate motion vectors.

8. The method of claim 7, wherein the plurality of candidate motion vectors further comprises a second set of candidate motion vectors and a third set of candidate motion vectors on a condition that the first set of candidate motion vectors comprises less than two candidate motion vectors, wherein the second set of candidate motion vectors is associated with at least one of the one or more blocks above the current block, the one or more blocks to the left of the current block, or the one or more blocks to the above-right of the current block, wherein each candidate motion vector of the first set of candidate motion vectors is associated with a higher priority value than each candidate motion vector of the second set of candidate motion vectors and each candidate motion vector of the third set of candidate motion vectors, and wherein each candidate motion vector of the second set of candidate motion vectors is associated with a higher priority value than each candidate motion vector of the third set of candidate motion vectors.

9. The method of claim 1, further comprising:
encoding the current block into a bitstream with at least one bit indicating an index associated with at least one reference frame of the motion vector for the current block.

10. The method of claim 1, wherein encoding the current block comprises transmitting at least one bit in a bitstream indicating which of the first reference motion vector or the second reference motion vector is used as the motion vector to encode the current block.

11. A method for decoding an encoded video stream, comprising:
determining, from bits included in the encoded video stream, a reference frame on a condition that a current block to be decoded was encoded using one of a plurality of inter-prediction modes, the current block comprising one of a plurality of blocks of a current frame of the encoded video stream;
identifying, for respective previously decoded blocks of a plurality of previously decoded blocks, a candidate motion vector used to inter predict the previously decoded block to define a plurality of candidate motion vectors;
determining, using a processor, for each candidate motion vector of the plurality of candidate motion vectors, a distance between the previously decoded block associated with the candidate motion vector and the current block;
determining, using the processor, for each candidate motion vector of the plurality of candidate motion vectors, a popularity value based on a set of previously decoded pixels associated with the candidate motion vector;
ranking each candidate motion vector of the plurality of candidate motion vectors within a list of candidate reference motion vectors according to a priority value for each candidate motion vector, the priority value based on the distance and the popularity value associated with the candidate motion vector;
determining a predicted motion vector from the plurality of candidate motion vectors, the predicted motion vector associated with the candidate motion vector having the highest popularity value;

determining a first effective motion vector and a second effective motion vector from the plurality of candidate motion vectors, the first effective motion vector and the second effective motion vector associated with the candidate motion vectors having the shortest distance;
selecting a reference motion vector from the predicted motion vector, the first effective motion vector, and the second effective motion vector based on the one of a plurality of inter-prediction modes used to encode the current block; and
decoding the current block using the reference motion vector, wherein the current block was encoded using compound prediction, and the reference frame is a first reference frame of at least two reference frames including the first reference frame and a second reference frame, the method further comprising:
determining reference blocks of the plurality of previously decoded blocks that share the at least two reference frames, wherein ranking each candidate motion vector comprises:
assigning a higher priority to candidate motion vectors from the reference blocks of the plurality of previously decoded blocks that share a same combination of the at least two reference frames within the list of candidate reference motion vectors than combinations of candidate motion vectors from others of the plurality of previously decoded blocks encoded using respective single reference frames of the at least two reference frames.

12. The method of claim 11, wherein decoding the current block comprises decoding bits within the encoded video stream indicating how the reference motion vector was used.

13. The method of claim 11, further comprising:
assigning the first effective motion vector to a first reference motion vector coding mode of the plurality of inter-prediction modes that uses the first effective motion vector for inter prediction; and
assigning the second effective motion vector to a second reference motion vector coding mode of the plurality of inter-prediction modes that uses the second effective motion vector for inter prediction, wherein the one of the plurality of inter-prediction modes comprises the first reference motion vector coding mode or the second reference motion vector coding mode, and decoding the current block comprises:
decoding the current block using the reference motion vector as the motion vector by determining a prediction block within the reference frame using the motion vector and combining a residual from the encoded video stream for the current block with the prediction block.

14. The method of claim 11, wherein the plurality of previously decoded blocks includes one or more blocks above the current block, one or more blocks to the left of the current block, one or more blocks to the above-right of the current block, or one or more blocks collocated with the current block in a frame separated from the current frame within a temporal sequence of the video stream by at least one frame.

15. The method of claim 14, wherein the plurality of candidate motion vectors comprises a first set of candidate motion vectors and a second set of candidate motion vectors, wherein each candidate motion vector of the first set of candidate motion vectors is associated with the one or more blocks above the current block, the one or more blocks to the left of the current block, or the one or more block to the above-right of the current block, and wherein each candidate motion vector of the first set of candidate motion vectors is associated with a higher priority value than each candidate motion vector of the second set of candidate motion vectors.

16. The method of claim 11, wherein the plurality of previously decoded blocks comprises one or more blocks from a previously decoded frame or one or more blocks from the current frame.

17. The method of claim 14, wherein the plurality of candidate motion vectors comprises a first set of candidate motion vectors associated with a set of previously coded blocks of the plurality of previously decoded blocks, the set of previously coded blocks associated with a plurality of reference frames, wherein each previously coded block of the set of previously coded blocks comprises the same plurality of reference frames, and wherein each candidate motion vector of the first set of candidate motion vectors is associated with a higher priority value than each of the other candidate motion vectors of the plurality of candidate motion vectors.

18. The method of claim 17, wherein the plurality of candidate motion vectors further comprises a second set of candidate motion vectors and a third set of candidate motion vectors on a condition that the first set of candidate motion vectors comprises less than two candidate motion vectors, wherein the second set of candidate motion vectors is associated with the one or more blocks above the current block, the one or more blocks to the left of the current block, or the one or more blocks to the above-right of the current block, wherein each candidate motion vector of the first set of candidate motion vectors is associated with a higher priority value than each candidate motion vector of the second set of candidate motion vectors and each candidate motion vector of the third set of candidate motion vectors, and wherein each candidate motion vector of the second set of candidate motion vectors is associated with a higher priority value than each candidate motion vector of the third set of candidate motion vectors.

19. An apparatus for encoding a video stream, comprising:
a processor configured to execute instructions to:
identify, for respective previously coded blocks of a plurality of previously coded blocks, a candidate motion vector used to inter predict the previously coded block to define a plurality of candidate motion vectors;
determine, for each candidate motion vector of the plurality of candidate motion vectors, a distance between the previously coded block associated with the candidate motion vector and a current block of a current frame;
determine, for each candidate motion vector of the plurality of candidate motion vectors, a popularity value based on a set of previously coded pixels associated with the candidate motion vector;
determine a first reference frame and a second reference frame for encoding the current block using compound prediction;
rank each candidate motion vector of the plurality of candidate motion vectors within a list of candidate reference motion vectors according to a priority value for each candidate motion vector, the priority value based on the distance and the popularity value associated with the candidate motion vector, wherein for encoding the current block using compound prediction, the processor is configured to rank each candidate motion vector by:

determining reference blocks of the plurality of previously coded blocks that share the first reference frame and the second reference frame; and
assigning a higher priority to candidate motion vectors from the reference blocks of the plurality of previously coded blocks that share a same combination of the first reference frame and the second reference frame within the list of candidate reference motion vectors than combinations of candidate motion vectors from others of the plurality of previously coded blocks encoded using respective single reference frames of the first reference frame and the second reference frame;
select, based on the priority values, a reference motion vector from the plurality of candidate motion vectors; and
encode a motion vector for the current block using the reference motion vector.

20. The apparatus of claim 19, wherein the processor is configured to encode the motion vector for the current block by at least one of:
differentially encoding the motion vector using the reference motion vector; or
including at least one bit within a bitstream in association with the current block indicating that the current block was encoded using a reference motion vector.

21. The method of claim 1, wherein ranking each candidate motion vector of the plurality of candidate motion vectors within a list of candidate reference motion vectors comprises:
assigning each candidate motion vector of the plurality of candidate motion vectors to one or a first category or a second category of the list of candidate reference motion vectors based on the distance;
ranking a respective candidate motion vector within the first category based on the popularity value associated with the respective candidate motion vector;
ranking a respective candidate motion vector within the second category based on the popularity value associated with the respective candidate motion vector; and
arranging the list of candidate reference motion vectors such that the ranked candidate motion vectors of the first category have a higher priority than the ranked candidate motion vectors of the second category.

22. The method of claim 21, wherein assigning each candidate motion vector of the plurality of candidate motion vectors to one or the first category or the second category comprises:
assigning a candidate motion vector of one or more blocks above the current block to the first category;
assigning a candidate motion vector of one or more block to the left of the current block to the first category;
assigning a candidate motion vector of a block to the above-right of the current block to the first category; and
assigning a candidate motion vector of one or more blocks collocated with the current block in a frame separated from the current frame within a temporal sequence of the video stream to the second category.

23. The method according to claim 1, further comprising:
assigning, as a predicted motion vector, a candidate motion vector within the list of candidate reference motion vectors having a highest priority value to a new motion vector coding mode that transmits a motion vector for inter prediction of the current block;
assigning, as a first reference motion vector, a candidate motion vector based on its position within the list of candidate reference motion vectors to a first reference motion vector coding mode that uses the first reference motion vector for inter prediction of the current block; and
assigning, as a second reference motion vector, a candidate motion vector based on its position within the list of candidate reference motion vectors to a second reference motion vector coding mode that uses the second reference motion vector for inter prediction of the current block, wherein
selecting the reference motion vector comprises selecting an inter-prediction mode for encoding the current block from the new motion vector coding mode, the first reference motion vector coding mode, the second motion vector coding mode, and a zero motion vector coding mode that uses a block from a same location within a reference frame as the current block as a prediction block.

24. The apparatus of claim 19, wherein the processor is configured to:
assign, as a predicted motion vector, a candidate motion vector within the list of candidate reference motion vectors having a highest priority value to a new motion vector coding mode that transmits a motion vector for inter prediction of the current block;
assign, as a first reference motion vector, a candidate motion vector based on its position within the list of candidate reference motion vectors to a first reference motion vector coding mode that uses the first reference motion vector for inter prediction of the current block; and
assign, as a second reference motion vector, a candidate motion vector based on its position within the list of candidate reference motion vectors to a second reference motion vector coding mode that uses the second reference motion vector for inter prediction of the current block, wherein:
the processor is configured to select the reference motion vector by selecting an inter-prediction mode for encoding the current block from the new motion vector coding mode, the first reference motion vector coding mode, the second reference motion vector coding mode, and a zero motion vector coding mode that uses a block from a same location within a reference frame as the current block as a prediction block, and
the processor is configured to encode the motion vector for the current block by encoding the current block using the selected inter-prediction mode.

* * * * *